United States Patent [19]

Laugier

[11] 4,391,031

[45] Jul. 5, 1983

[54] METHOD OF ASSEMBLING TWO SHAPED SECTIONS WITH A COTTER

[75] Inventor: Yves D. Laugier, Toulouse, France

[73] Assignee: Technal International S.A., Toulouse, France

[21] Appl. No.: 283,344

[22] Filed: Jul. 14, 1981

[30] Foreign Application Priority Data

Jul. 21, 1980 [FR] France .............................. 80 16083

[51] Int. Cl.³ .............................................. B23P 19/00
[52] U.S. Cl. .................................. 29/526 R; 403/252; 403/376; 403/409
[58] Field of Search ............. 29/526 R; 403/323, 376, 403/378, 379, 409, 247, 252

[56] References Cited

U.S. PATENT DOCUMENTS

| | | | |
|---|---|---|---|
| 1,241,042 | 9/1917 | Small | 403/376 |
| 2,905,514 | 9/1959 | Friend | 403/247 |
| 3,176,812 | 4/1965 | Towne | 403/379 X |
| 3,265,418 | 8/1966 | Diamond | 403/376 |
| 3,348,427 | 10/1967 | Wilkey | 403/378 X |
| 3,830,577 | 8/1974 | Rampe et al. | 29/526 R X |
| 3,969,951 | 7/1976 | Blackwood | 29/526 R X |
| 4,090,709 | 5/1978 | Fujii | 29/526 R X |
| 4,167,355 | 9/1979 | Hansson | 403/409 X |
| 4,212,559 | 7/1980 | Persson | 403/379 X |
| 4,280,269 | 7/1981 | Marini | 29/526 R |

Primary Examiner—Charlie T. Moon
Attorney, Agent, or Firm—Shlesinger, Arkwright, Garvey & Dinsmore

[57] ABSTRACT

The invention concerns a method for assembling two shaped sections (1, 2) at intersecting directions. This method consists in engaging one of the shaped sections, 2, into a slot fashioned in the other 1, and in locking the latter using cotters 3 comprising a rod with a thinned segment on part of its periphery; each cotter is introduced by simple sliding action in a hole with its thinned part in contact with the shaped section 2 and then is made to pivot to ensure the locking.

The invention is applicable in particular to the housing and construction industries to assemble balustrade or stairway uprights and rails.

9 Claims, 13 Drawing Figures

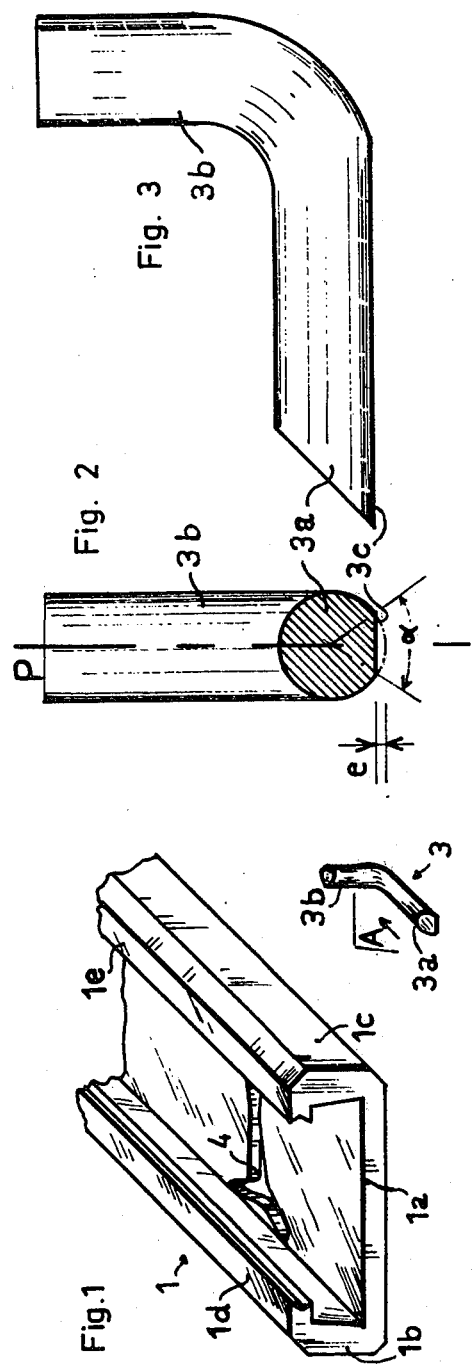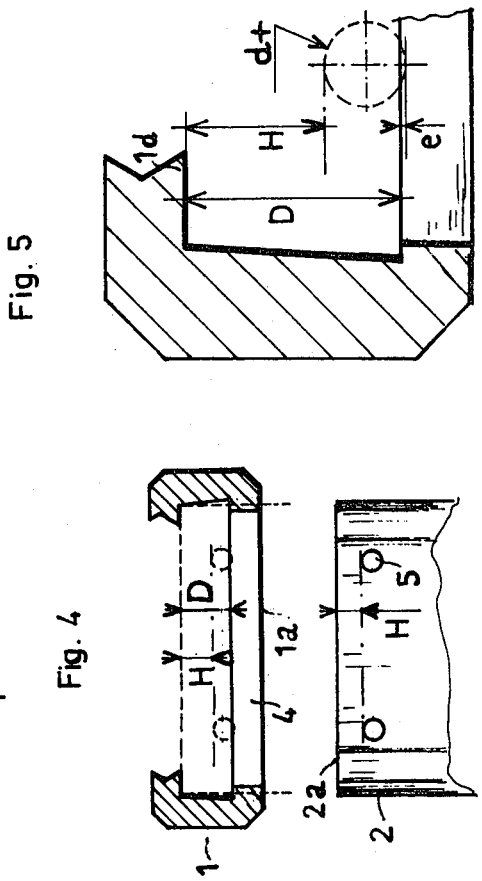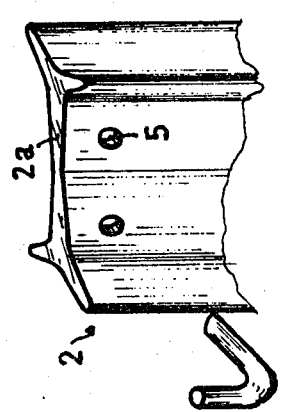

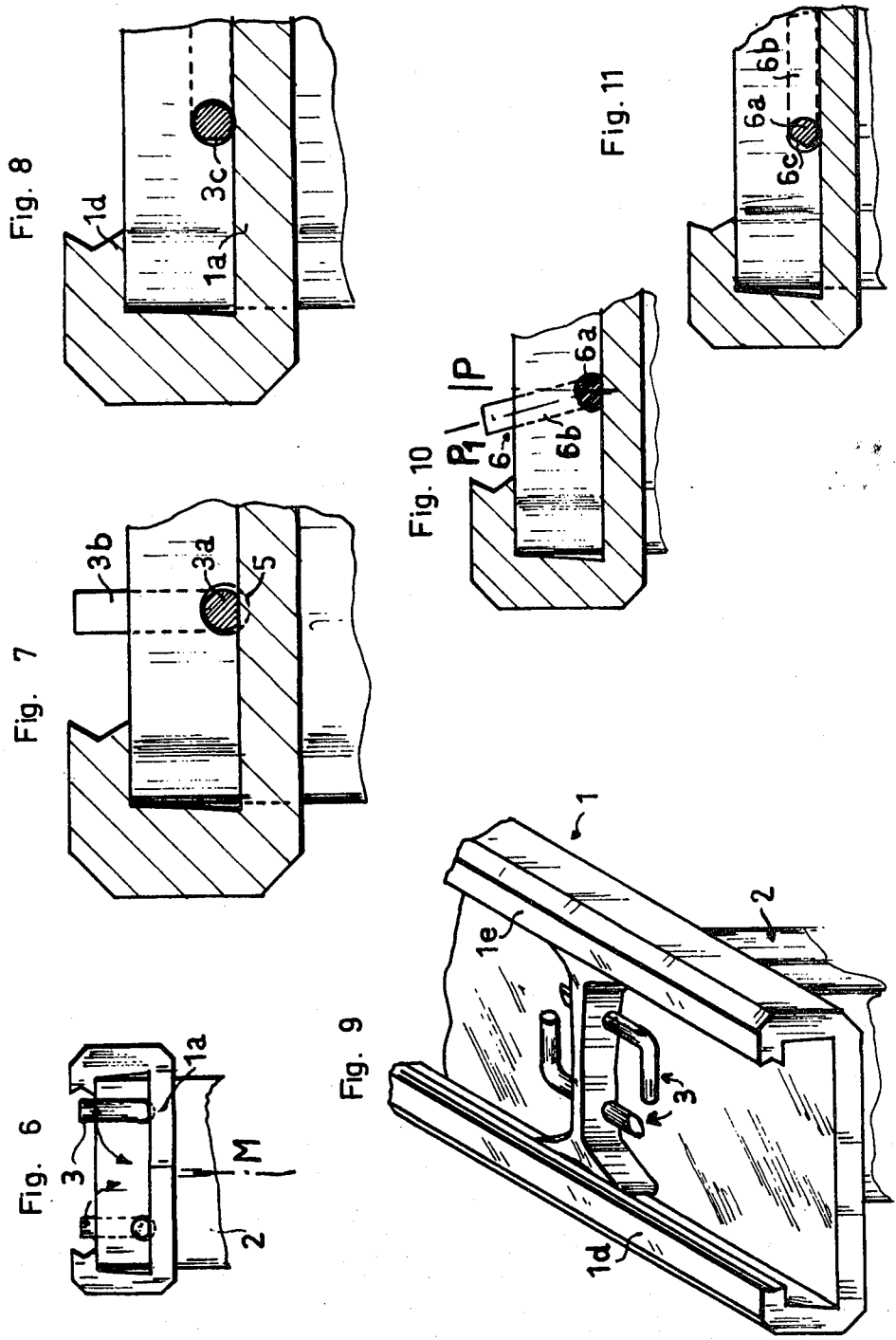

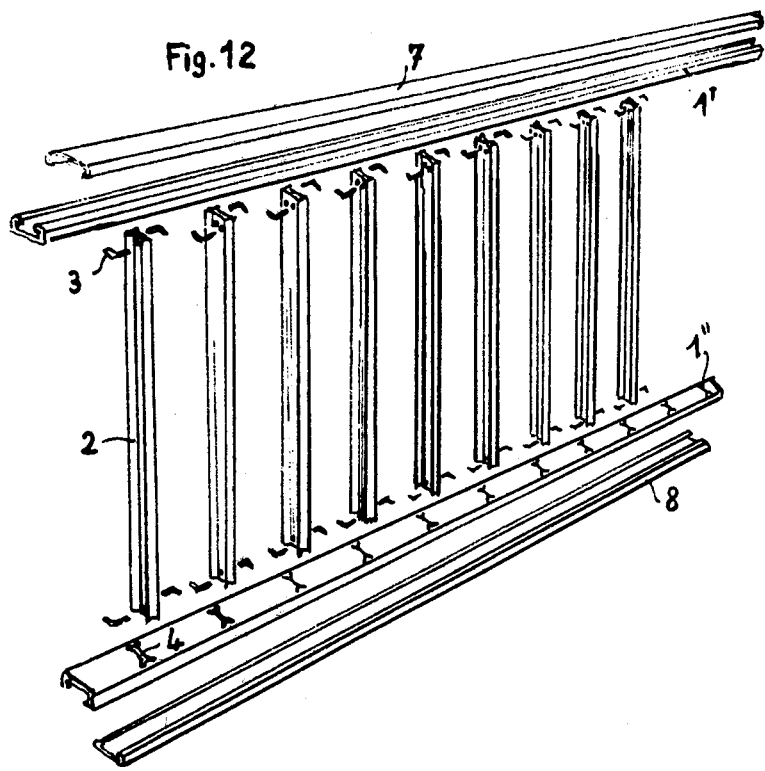
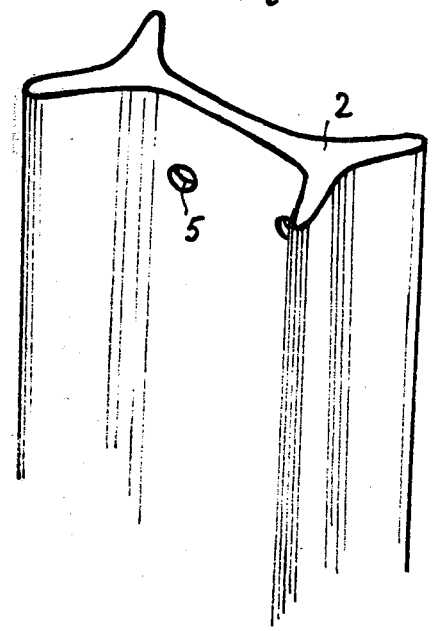

METHOD OF ASSEMBLING TWO SHAPED SECTIONS WITH A COTTER

The invention concerns a method for assembling two shaped sections at intersecting directions, in particular orthogonal directions and, extends to cotters adapted to implement this method. The invention in particular is applicable in construction to achieve the assembly of the uprights and rails (high and low) of balustrades or railings.

Presently, shaped-section assembly methods are known, particularly in housing and construction as indicated above, whereby one of the shaped sections is made to penetrate the other and the two shaped sections are locked using a cotter means forced-fitted into one or more holes fashioned in one of the shaped sections. Reference is made to French Pat. No. 2 128 366 or to the French Pat. No. 2 268 029 for more details on this assembly method. These assemblies offer several advantages, namely good mechanical strength, great simplicity of the components used, as they require the presence of a simple cotter means, and the esthetics of their appearance (the cotter means located in one of the shaped sections can be masked).

However such assemblies suffer from drawbacks that have proved substantial in practice. In the first place, force-fitting the cotter means in place is a difficult operation of little practicality whereby scratches on the shaped sections are incurred. Moreover, once performed, the assembly is exceedingly difficult to take apart and always in some degradation of the shaped sections. To-date these drawbacks could only be averted at the cost of substantially increased complexity in the assembly structure. Assembly simplicity and hence its low cost are the prime qualities of this type of material (use in particular in housing, where a high number of assemblies must be performed in repetitive manner), so that presently the problem has been poorly solved, and this has been the situation already for some time.

The object of the present invention is to remedy the above cited drawbacks of the known assemblies and to provide an improved assembly method combining the advantages of the conventional assembly methods (simplicity and low cost of the components used, good mechanical strength, esthetics) with a great ease in implementation and easy disassembly as needed.

To that end, the process of the invention for assembling two shaped sections—of which one comprises a wall rimmed by two flanges with bends—comprises fashioning in the wall of the first shaped section a slot of a cross-section corresponding to that of the second shaped section, and fashioning in the second shaped section at least one hole for passing the cotter, the second shaped section being inserted into the slot of the first shaped section and the cotter into the hole of the second shaped section. The method of the present invention is characterized in that one of more cotters are used, which comprise(s) a rod with a thinned-out segment over part of its periphery and at least one hole of a diameter fitted to permit passing the cotter rods is fashioned in the second shaped section, each hole being located at a distance from the end face of the second shaped section in such a manner that after the second shaped section is in place in the slot of the first and with its face resting against the bends of the first shaped section, said hole provides a visible portion projecting beyond the wall of the first shaped section by a height at least equal to the thickness of the cotter rod at its thinned out zone and less than the thickness of the said rod in the unthinned zone. The second shaped section is inserted into the slot of the first shaped section until its end face rests against the bends of the first shaped section each cotter is inserted into the visible portion of a hole of the second shaped section by placing its thinned segment against the wall of the first shaped section, and each cotter is rotated about the longitudinal axis of its rod for the purpose of positioning its unthinned part in compression against the wall of the first shaped section.

The implementation of such a method is easy and comprises no delicate operation at all. Each cotter is introduced by a mere sliding motion into the visible portion of the corresponding hole without a risk of scratching the shaped sections. Thereupon the rotation of the cotters ensures locking the two shaped sections, whereby the assembly benefits of excellent mechanical strength.

In order to facilitate the rotation of the cotters, each of these comprises a rod preferably provided with an extension misaligned from this rod and for instance at right angle to it. The pivoting motion is easily ensured by maneuvering said extension to bring it near or resting against the wall of the first shaped section.

If necessary, disassembly is possible by carrying out the inverse operation, whereby the cotter is released and can be pulled out of the hole in simple manner without danger of degrading the shaped sections.

In an advantageous mode of implementation, use can be made of a cotter with a cylindrical rod of diameter d which is flattened by a plane by a thickness e to obtain the thinned part. In this case each hole fashioned in the second shaped section is so located that the rim of of this second shaped section be a distance H from the end face so that $D-d<H\leq d+e$, where D is the distance between the bends and the wall of the first shaped section. As will be better understood below, this condition guaranties at the same time the easy insertion of the cotter by orienting it in such a manner that its plane surface slides against the wall of the first shaped section and achieves locking when said cotter is rotated in order to bring its unthinned cylindrical part in compression against this wall of the first shaped section.

Depending on the application, the assembly may be implemented by one, two or a larger number of cotters. In the case of a single cotter, the hole for emplacing it preverbaly is fashioned nearly in the median plane of the second shaped section so that locking takes place approximately symmetrically with respect to the shaped sections.

In many applications, it is desirable to have two cotters assuring high mechanical strength in the assembly. In that case two holes are fashioned in the second shaped section, one on one side of the median plane of this second shaped section and the other on the other side.

As regards the means for implementing the method, the present invention covers the cotters of the above described type comprising a rod and an extension of the rod misaligned from it wherein the rod has a thinned segment over part of its periphery, thinned segment extending over the entire length of said rod.

The invention applies especially to the housing industry, the first shaped section representing in particular a balustrade or stairway rail and the second shaped section being a balustrade or stairway upright. These shaped sections may be made of a lightweight alloy or other suitable material.

Other characteristics, purposes and advantages of the invention will become clear in relation to the description below and the corresponding drawings attached hereto, which show in illustrative and non-restrictive manner an embodiment and a variation for the field of application cited above; as regards the drawings which are an integral part of the description, and in which FIG. 1 is a perspective view of the assembly elements ready for assembly, FIG. 2 is a schematic view on an enlarged scale and with a front section along A of a cotter of the invention, FIG. 3 is a plan view of this cotter, FIGS. 4, 5, 6, 7 and 8 illustrate the assembly method, FIG. 9 is a perspective of the achieved assembly, FIGS. 10 and 11 illustrative a variation of the assembly method, FIG. 12 is a schematic perspective of a set of bars of a balustrade or stairway railing achieved in conformity with the invention, and FIG. 13 shows an upright of said set on a larger scale.

The shaped sections which are to be assembled and illustratively shown in the figures are made of lightweight aluminum and consist of an upper rail 1 of a balustrade or stairway railing (first shaped section) and of a balustrade or stairway upright 2 (second shaped section).

The rail 1 consists of a wall $1a$, two side flanges $1b$, $1c$ and two short bends $1d$ and $1e$ pointing toward the inside of the shaped section parallel to the wall $1a$. A banister may be conventionally latched into this rail after the assembly so as to seal it at the upper surface.

Each upright 2 to be assembled with this rail is of a double Y cross-section with a width slightly less than that of the rail wall.

The assembly is implemented using two cotters such as 3 each comprising a rod $3a$ and an extension $3b$, which in the example is oriented at 90° to said rod. The rod $3a$ has a cylindrical cross-section with a flattened surface $3c$ which thins it by a thickness e on part of its periphery so as to form a thinned segment.

In the example, the extension $3b$ is approximately located in the symmetry plane P of the plane surface $3c$ (the plane of symmetry of the narrowed part of the rod). Moreover this extension $3b$ is of a length substantially less than the width of the rail for the purpose of allowing being moved against it as shown further below.

The flattened segment $3c$ essentially is planar and extends over the entire length of the rod so as to subtend an angle alpha of about 60°. In practice this angle is a function of the application and of the assembly materials and may range from 30° to 90°.

The rod $3a$ of the cotter for instance may have a diameter d of about 3 mm and can be flattened by a thickness e substantially between 0.3 mm and 0.8 mm. This value accordingly represents the difference in thickness between the flattened and the unflattened part of the rod.

Moreover the end of the rod 3 may be at a slant as shown in FIG. 3 in order to facilitate its insertion in the holes of the upright 2.

The first phase of the method consists in fashioning in manner known per se with respect to this type of assembly a slot 4 in the wall of the rail 1, where this slot corresponds in its shape to the cross-section of the upright 2 to allow same to be inserted with gentle friction.

Two cylindrical holes such as 5 then are fashioned into the upright 2. Each hole has a diameter $d+$ equal to that of the cotter's rods $3a$ plus the play.

These holes are so positioned with respect to the end face $2a$ of the upright that the distance H of their rim with respect to this face (FIGS. 4 and 5) satisfies the condition $D-d<H\leq D-d+e$, where D is the distance between the bends $1d$, $1e$ and the wall $1a$ of the rail. Preferably H will be chosen to be equal or merely so to $D-d+e$, which is the most effective locking value for the given cotter. For every application the holes so positioned can be rapidly implemented using a jig.

Once the holes 5 are made, the upright 2 is inserted into the slot 4 of the rail 1 until latter's face $2a$ comes to rest against the bends $1d$ and $1e$ of the rail. In this position and due to the above described location of the holes 5, these have a visible portion at the wall $1a$ of the rail and a visible portion projecting beyond this wall. This visible portion is of a height equal to or slightly exceeding the thickness $(d-e)$ of the cotter rod at its flatted surface $8c$.

Thereby it is possible to simply slide the cotter rods into each of the holes 5 by placing their flattened surface $3c$ against the wall $1a$ of the rail, as illustrated in FIGS. 6 and 7. Preferably one of the cotters is inserted from one side of the upright and the other from the other side so that their extensions $3b$ will not interfere when being brought against the wall.

Each cotter 3 then is made to pivot by about 90° toward the median plane M of the upright by pressure exerted on its extension $3b$ to rest against or be near the wall $1a$ of the rail. This maneuver can be implemented very quickly by a simple hammer below.

This terminates the assembly. During the rotation of the cotter, the flattened surface $3c$ gave up its place to the cylindrical, unthinned part of the rod 3 of the cotter, and the upright 2 thereby is locked in position between said cotters and the two bends $1d$ and $1e$ of the rail.

It should be noted that in the example, the flanges $1b$ and $1c$ of the rail are slightly sloping inward, this design allowing additionally locking the upright by forcing the upper part against the said flanges near where they join the bends. This additional locking is not mandatory but may be recommended if substantial side stresses may be exerted on one of the shaped sections; this locking may be obtained by any other means, for instance by the presence of short ribs provided on the rail bends at right angles to the sides of the upright.

The dismantling of the assembly is just as easy as the assembling procedure, is being enough to pivot the cotters 3 in the reverse direction (in particular by using a thin-edge tool such as a screwdriver) and to withdraw them.

FIGS. 10 and 11 illustrate a variation of the method which may be preferred where the assembly is exposed to vibrations.

In this variation, cotters 6 are used of which the extensions $6b$ are located in a plane $P_1$ angularly offset from the plane of symmetry P of the flattened surface $6c$ of the cotter rod (which forms its thinner segment).

The assembly procedure is the same as that previously described but each cotter 6 is made to pivot by an angle exceeding 90°; thereby the locking of the assembly is much improved. It should be noted that in this variation the location of the two cotters on each side of the upright makes it possible to provide a single type of cotter.

Obviously the invention is not restricted to the above description but includes all variations. The cotters with their flattened surface can be manufactured in any way. As a rule, the invention covers any kind of cotter-rod cross-section where one segment is thinned and an adjoining segment is not.

Similarly the terms "flanges", "bends" which are used to denote the structure of the first shaped section must be understood in the broadest sense, the bends where appropriate joining together to form a continuous side.

FIG. 12 is a schematic of a set of bars of a balustrade or stairway railing implemented in the manner of the invention. This figure also shows the uprights 2 which are assembled at the top and at the bottom to a high rail 1' and a low rail 1'' resp. using cotters 3 of the invention. A banister 7 covers the high rail while a shaped functional section 8 closes the low rail. The banister 7 and shaped section 8 clip on by their edges to the rails 1 and 1'.

FIG. 13 shows in greater detail the cross-section of the uprights 2.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

What is claimed is:

1. A method for assembling first and second shaped sections at substantially perpendicular directions comprising:
   providing a first shaped section having a wall (1a), two flanges (1b, 1c), two bends (1d, 1e) and a slot formed in said wall, said slot having a configuration such as to receive said second shaped section therein,
   providing at least one cotter (3) comprising a rod (3a) having a thinned segment formed on a portion of its periphery,
   providing a second shaped section having a cross-sectional configuration complementary to said slot and at least one circular aperture for receiving a cotter, said aperture being positioned in said second shaped section such that when said second shaped section is inserted in said slot and abutted against said bends, said aperture extends beyond said first section a distance at least as great as the thickness of said cotter at said thinned segment and less than the thickness of said cotter at its unthinned segment,
   inserting said second shaped section (2) into said slot (4) until its end (2a) abuts the bends (1d, 1e) of said first shaped section,
   inserting said at least one cotter into said at least one aperture with said thinned segment against the wall of said first shaped section, and
   rotating said at least one cotter about the longitudinal axis thereof for urging the unthinned portion thereof in compression against said wall.

2. A method as in claim 1, wherein said cotter (3) comprises a cylindrical rod (3a) of diameter d thinned by a flattened surface (3c) by a thickness e to achieve said thinned segment, and wherein said at least one aperture in said second shaped section is so located that the rim of said aperture is at a distance H from the end face (2a) such that $$D-d<H\leq D-d+e$$

where D is the distance between the wall (1a) and the bends (1d, 1e) of the first shaped section.

3. A method as in claim 2, and wherein said at least one aperture has substantially the same diameter as said at least one cotter (3) and said aperture is positioned in the second shaped section, in such a manner that the distance is substantially equal to $D-d+e$.

4. A method as in claim 1, and wherein each of said cotters (3) comprise a rod (3a) provided with an offset extension (3b) and in that the rotation of each cotter (3) is implemented by maneuvering said extension (3b) toward the wall (1a) of the first shaped section.

5. A method as in claim 4, and wherein said extension (3b) is located approximately in the plane of symmetry P of the thinned part of the rod (3a), each cotter being made to pivot by an angle of about 90°.

6. A method as in claim 4, and wherein said extension (6b) is located in a plane $P_1$ angularly offset from the plane of symmetry P of the thinned rod part (6a), each other cotted (6) being made to pivot by an angle exceeding 90°.

7. A method as in claim 1, 2, 3, 4, 5 or 6, wherein said second shaped section includes two of said apertures located on either side of the median plane M of the second shaped section (2) and inserting two of said cotters (3) in said apertures.

8. A method as in claim 7, characterized in that said two cotters (3) are inserted into the holes (5) of the second shaped section (2) from opposite sides of said second shaped section, said cotters (3) then being made to pivot toward the median plan M of the second shaped section.

9. A method as in claim 7, characterized in that said first shaped section (1) is a stairway or balustrade rail of a lightweight alloy, inserting another shaped section into said rail for sealing it, and in that said second shaped section (2) comprises a balustrade upright having a cross-section substantially in the shape of a double Y.

* * * * *